(12) United States Patent
Itaba et al.

(10) Patent No.: US 7,653,680 B2
(45) Date of Patent: Jan. 26, 2010

(54) MOBILE SOFTWARE DISTRIBUTION SYSTEM, SERVER, TERMINAL AND METHOD

(75) Inventors: Naoto Itaba, Tokyo (JP); Toshiyuki Tamura, Tokyo (JP); Masayuki Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 304 days.

(21) Appl. No.: 10/558,074

(22) PCT Filed: May 26, 2004

(86) PCT No.: PCT/JP2004/007178

§ 371 (c)(1),
(2), (4) Date: Nov. 23, 2005

(87) PCT Pub. No.: WO2004/107797

PCT Pub. Date: Dec. 9, 2004

(65) Prior Publication Data

US 2006/0264206 A1   Nov. 23, 2006

(30) Foreign Application Priority Data

May 28, 2003   (JP)   ............................. 2003-150060

(51) Int. Cl.
G06F 15/16   (2006.01)
(52) U.S. Cl. .................................................... 709/201
(58) Field of Classification Search ................ 709/201, 709/217; 455/418, 419, 517
See application file for complete search history.

(56) References Cited

U.S. PATENT DOCUMENTS 5,974,312 A * 10/1999 Hayes et al. ................ 455/419
6,046,978 A * 4/2000 Melnik ........................ 370/221
6,128,483 A * 10/2000 Doiron et al. ............... 455/419
6,195,546 B1 * 2/2001 Leung et al. ................ 455/419
6,574,197 B1 * 6/2003 Kanamaru et al. .......... 370/252
6,643,506 B1 * 11/2003 Criss et al. .................. 455/419
6,885,862 B1 * 4/2005 Pearson ...................... 455/419
6,970,698 B2 * 11/2005 Majmundar et al. ......... 455/419
7,013,157 B1 * 3/2006 Norman et al. ............. 455/503

(Continued)

FOREIGN PATENT DOCUMENTS

JP   5-128022 A   5/1993

(Continued)

OTHER PUBLICATIONS

Hubbard, Jordan. pkg_add(1). Nov. 24, 1994. FreeBSD 3.0-RELEASE. pp. 1-4.*

(Continued)

*Primary Examiner*—Salad Abdullahi
*Assistant Examiner*—Imad Hussain
(74) *Attorney, Agent, or Firm*—Foley & Lardner LLP

(57) ABSTRACT

A mobile communication system capable of efficiently updating software in a group of target terminals only when the software needs to be rewritten. When there is a mobile terminal (UE#1, UE#2) that needs the update of the software version, the server transmit an OTASP request that contains terminal type and software version information to GGSN. The OTASP request is forwarded via the GGSN, SGSN, and RNC to the mobile terminal (UE#1, UE#2). The mobile terminal (UE#1, UE#2) compares its type and software version with those contained in the paging channel, and if they match, transmits an RRC connection request to the RNC.

11 Claims, 14 Drawing Sheets

U.S. PATENT DOCUMENTS

| | | | |
|---|---|---|---|
| 7,073,053 B1 * | 7/2006 | Oz et al. | 713/2 |
| 7,305,696 B2 * | 12/2007 | Thomas et al. | 725/114 |
| 7,511,840 B2 * | 3/2009 | Sato | 358/1.15 |
| 2002/0116515 A1 * | 8/2002 | Hashimoto | 709/230 |
| 2003/0177199 A1 * | 9/2003 | Zenoni | 709/217 |
| 2003/0214966 A1 * | 11/2003 | Taylor | 370/432 |
| 2004/0022216 A1 * | 2/2004 | Shi | 370/335 |
| 2004/0236998 A1 * | 11/2004 | Blumberg et al. | 714/38 |
| 2006/0070058 A1 * | 3/2006 | Menahemi et al. | 717/171 |
| 2007/0169075 A1 * | 7/2007 | Lill et al. | 717/168 |

FOREIGN PATENT DOCUMENTS

| | | | |
|---|---|---|---|
| JP | H05-012802 | * | 5/1993 |
| JP | 2000-278743 A | | 10/2000 |
| JP | 2001-28787 A | | 1/2001 |
| JP | 2001-43087 A | | 2/2001 |
| JP | 2003-51796 A | | 2/2003 |

OTHER PUBLICATIONS

3GPP2 Access Network Interface Interoperability Specification Release A, Jun. 2000, pp. 92-96.

3GPP2 Access Network Interface Interoperability Specification Release A, Jun. 2000, pp. 92-96.

"W-CDMA Mobile Communications System, Chapter 4: Network Technologies, Chapter 4-3: Network control and signaling scheme," edited by Keiji Tachikawa, published by Maruzen Co., Ltd., Jun. 25, 2001, pp. 254-256.

* cited by examiner

FIG. 2
(a) FIRST DAY   BROADCAST
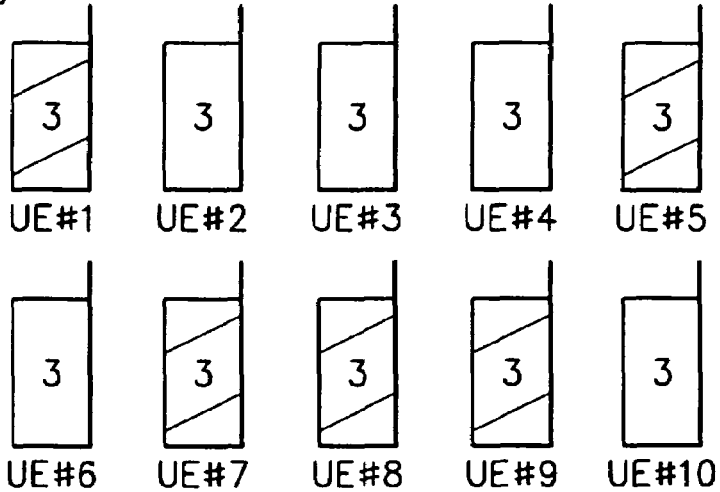
(b) SECOND DAY   BROADCAST
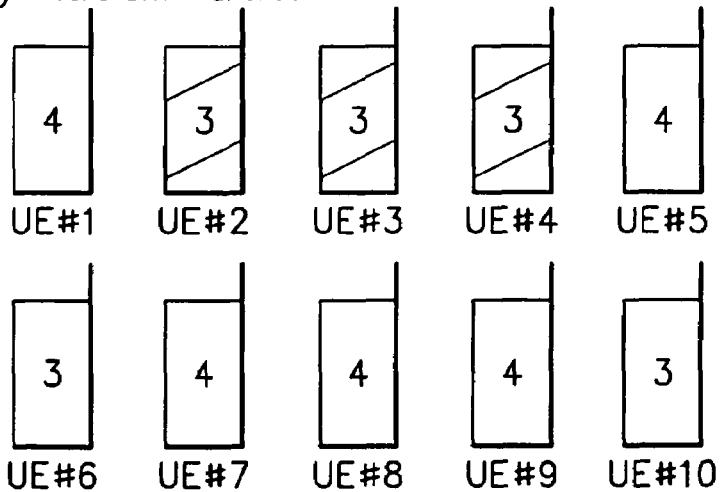
(c) NTH DAY   MULTICAST
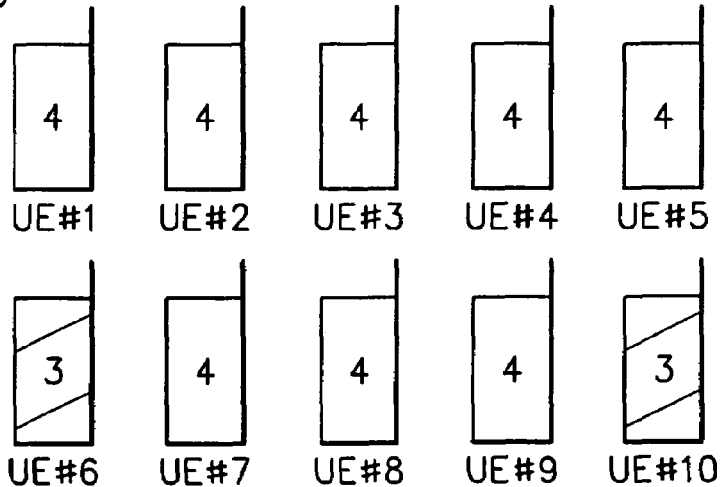

FIG. 7

10.3.3.23 Paging record

| Information Element / Group name | Need | Multi | Type and reference | Semantics description |
|---|---|---|---|---|
| CHOICE Used paging identity | MP | | | |
| >CN identity | | | | |
| >>Paging Cause | MP | | Paging Cause 10.3.3.22 | |
| >>CN domain identity | MP | | CN domain identity 10.3.1.1 | |
| >>CHOICE UE Identity | MP | | | Three spare values are needed. |
| >>>IMSI (GSM-MAP) | | | IMSI (GSM-MAP) 10.3.1.5 | |
| >>>TMSI (GSM-MAP) | | | TMSI (GSM-MAP) 10.3.1.17 | |
| >>>P-TMSI (GSM-MAP) | | | P-TMSI (GSM-MAP) 10.3.1.13 | |
| >>>IMSI (DS-41) | | | TIA / EIA / IS-2000-4 | |
| >>>TMSI (DS-41) | | | TIA / EIA / IS-2000-4 | |
| >>>IMEI-SV | | | | SNR (serial number) in IMEI-SV is not considered |

F I G. 8

| Information Element / Group name | Need | Multi | Type and reference | Semantics description |
|---|---|---|---|---|
| >UTRAN identity | | | | |
| >>U-RNTI | MP | | U-RNTI 10.3.3.47 | |
| >>CN originated page to connected mode UE | OP | | | |
| >>>Paging Cause | MP | | Paging Cause 10.3.3.22 | |
| >>>CN domain identity | MP | | CN domain identity 10.3.1.1 | |
| >>>Paging record type identifier | MP | | Paging record type identifier 10.3.1.10 | |

| Condition | Explanation |
|---|---|
| CHOICE Used paging identity | Condition under which the given used paging identity is chosen |
| CN identity | For CN originating pages (for idle mode UEs) |
| UTRAN identity | For UTRAN originating pages (for connected mode UEs) |

F I G. 14
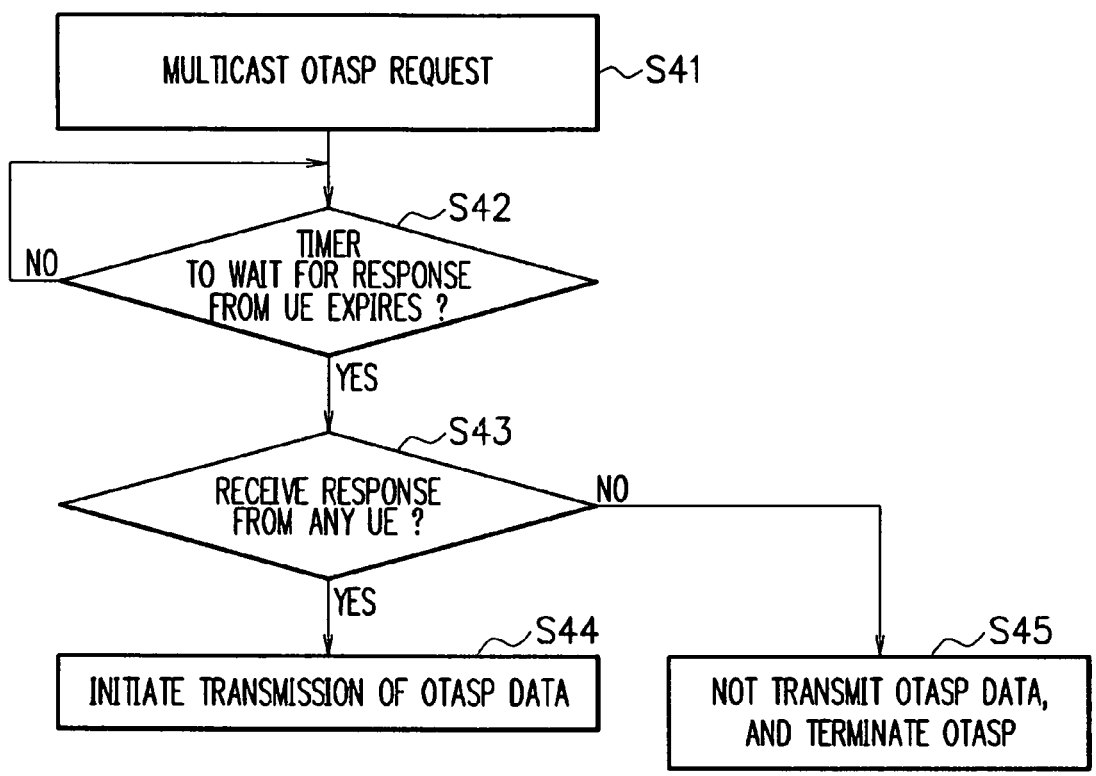

F I G. 15
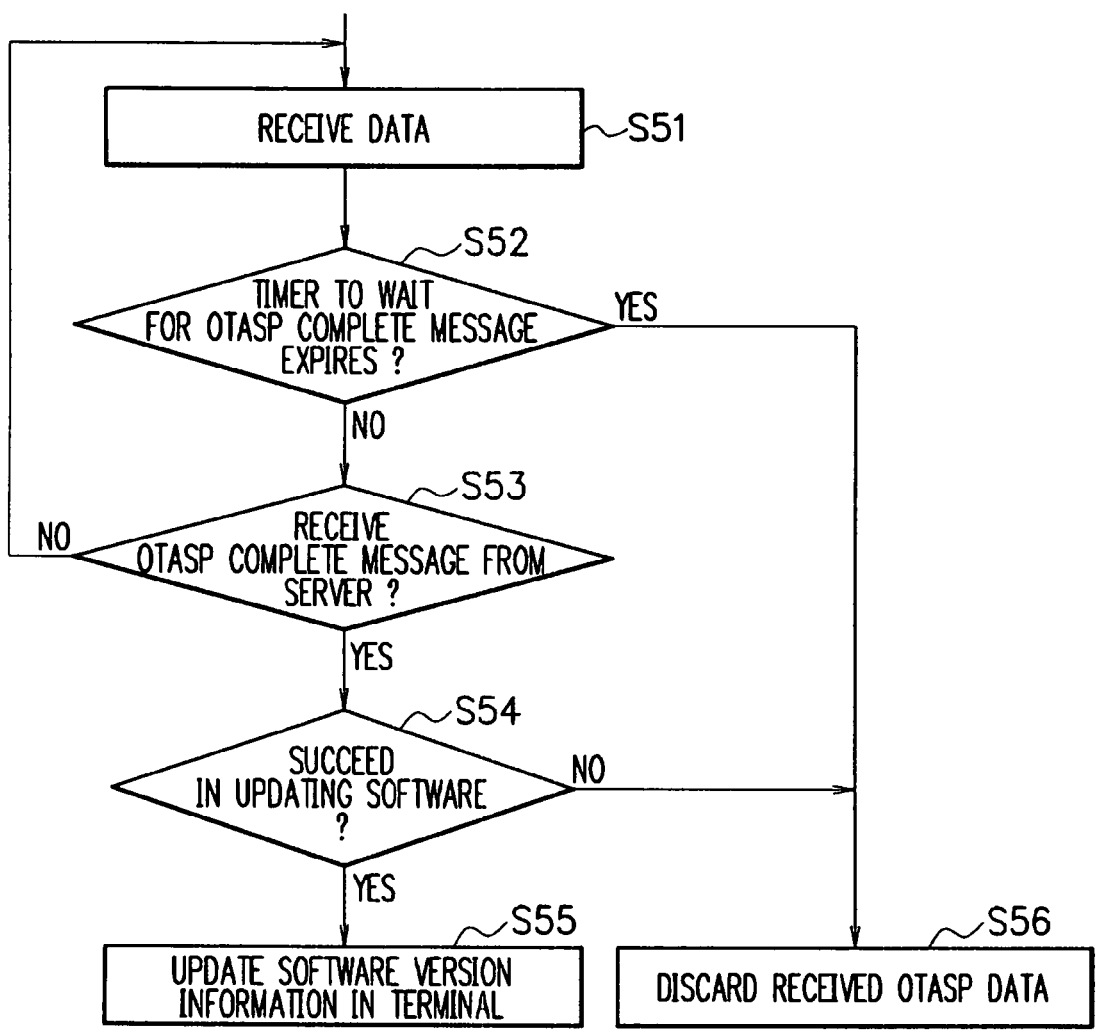

MOBILE SOFTWARE DISTRIBUTION SYSTEM, SERVER, TERMINAL AND METHOD

TECHNICAL FIELD

The present invention relates to a mobile communication system, a server, a mobile terminal and a data transmission method applied to the same, and more particularly, to a data transmission method for updating software in a mobile phone.

BACKGROUND ART

In a recent mobile phone system, subscribers to mobile phone services have been dramatically increasing, and there have been cases where mobile terminals already sold are recalled to repair the failure thereof.

For purposes including to avoid the recall of mobile terminals, 3GPP2 (3rd Generation Partnership Project 2) has been studying OTASP (Over The Air Service Provisioning) to rewrite or update software in a mobile terminal via radio (e.g. see Non Patent Document 1).

In this case, paging may be used as a technique for specifying a mobile terminal whose software is to be rewritten. In the paging technique, when there is an incoming call or data to a mobile terminal, it is required to inform the mobile terminal of the call, and all mobile terminals in the location registration area where the mobile terminal has registered the location are informed of the call by broadcast. Accordingly, the mobile terminal recognizes the paging thereto since it is always monitoring a paging channel even in idle mode (e.g. see Non Patent Document 2).

However, it is inefficient to forward data to each of mobile terminals one by one, and therefore, techniques have been proposed in which data is broadcast to all mobile terminals whose software needs to be rewritten (e.g. see Patent Documents 1 and 2).

Patent Document 1: Japanese Patent Laid-Open No. 2001-28787 (Paragraphs 7 and 8, FIG. 1)

Patent Document 2: Japanese Patent Laid-Open No. 2003-51796 (Paragraphs 6 to 8, FIG. 1)

Non Patent Document 1: 3GPP2 Access Network Interface Interoperability Specification Release A, June, 2000

Non Patent Document 2: "W-CDMA Mobile Communications System, Chapter 4: Network Technologies, Chapter 4-3: Network control and signaling Scheme" edited by Keiji Tachikawa, published by Maruzen Co., Ltd., Jun. 25, 2001, pp 254-256

DISCLOSURE OF THE INVENTION

Problems that the Invention is to Solve

In aforementioned OTASP reviewed by 3GPP2, data is transmitted with respect to each mobile terminal, and the technology does not take full advantage of a characteristic of radio that a plurality of mobile terminals can receive the same data simultaneously. The transmission of data to each of mobile terminals one by one causes congestion in the mobile communication system.

Besides, according to the techniques in which data is broadcast to all mobile terminals whose software needs to be rewritten, mobile terminals whose software need not be rewritten also receive the data, and, on determining that the data is not necessary, have to discard the data. In other words, the techniques have a problem in that, even if its software need not be rewritten, a mobile terminal is necessitated to receive data and makes a determination as to the necessity of the data, resulting in an increase in the power consumption of the mobile terminal.

It is therefore an object of the present invention to provide a mobile communication system, a server, a mobile terminal and a data transmission method applied to the same, capable of efficiently updating software in a group of target terminals only when the software needs to be rewritten.

Means of Solving the Problems

In accordance with an aspect of the present invention, there is provided a mobile communication system in which data are transmitted/received via radio between a server and mobile terminals, wherein the server includes at least a means for paging a target mobile terminal by transmitting thereto a request attached with information on the type of the mobile terminal.

In accordance with another aspect of the present invention, there is provided a mobile communication system in which OTASP (Over The Air Service Provisioning) is performed to rewrite or update software in mobile terminals based on data transmitted via radio from a server, wherein the server includes a means for paging a target mobile terminal by transmitting thereto, when OTASP is to be performed, a request attached with information on the type of the mobile terminal and the version of the software.

In accordance with another aspect of the present invention, there is provided a server which transmits/receives data to/from mobile terminals via radio, including at least a means for paging a target mobile terminal by transmitting thereto a request attached with information on the type of the mobile terminal.

In accordance with another aspect of the present invention, there is provided a server which transmits data via radio for performing OTASP (Over The Air Service Provisioning) to rewrite software in mobile terminals, including a means for paging a target mobile terminal by transmitting thereto, when OTASP is to be performed, a request attached with information on the type of the mobile terminal and the version of the software.

In accordance with another aspect of the present invention, there is provided a mobile terminal in a mobile communication system in which OTASP (Over The Air Service Provisioning) is performed to rewrite software in the mobile terminal based on data transmitted via radio from a server, comprising a means for determining, based on terminal type and software version information attached to a request received when OTASP is to be performed, whether or not the request is directed to the terminal, and a means for, when having determined that the request is directed to the terminal, updating the software based on the data transmitted from the server.

In accordance with another aspect of the present invention, there is provided a data transmission method applied to a mobile communication system in which data are transmitted/received via radio between a server and mobile terminals, the method including, on the server side, at least the step of paging a target mobile terminal by transmitting thereto a request attached with information on the type of the mobile terminal.

In accordance with another aspect of the present invention, there is provided a data transmission method applied to a mobile communication system in which OTASP (Over The Air Service Provisioning) is performed to rewrite software in mobile terminals based on data transmitted via radio from a server, the method including, on the server side, the step of paging a target mobile terminal by transmitting thereto, when OTASP is to be performed, a request attached with information on the type of the mobile terminal and the version of the software.

As is described above, the mobile communication system of the present invention is characterized in that, in mobile communication broadcasting or multicasting, the server distributes data to a group of target mobile terminals without a request therefrom, thus updating software in the mobile terminals. In addition, software that has been once updated is not to be repeatedly updated.

Generally, in the case of broadcast, all mobile terminals can receive data. However, in accordance with the present invention, only target mobile terminals can receive data.

Besides, generally, in the case of multicast, the user of a mobile terminal joins the service of his/her own free will to receive data. The present invention, however, proposes that the server pages, from the network side, a mobile terminal using information that uniquely identifies the mobile terminal, such as IMEI-SV (the International Mobile station Equipment Identity and Software Version number).

Further, in accordance with the present invention, the soundness of software is checked. Therefore, the same data is not to be received in the event of success in updating software, while the same data can be received again in the event of failure.

In OTASP (Over The Air Service Provisioning) using broadcast, the network side is not required to confirm the presence of a target mobile terminal, and receive no response from the mobile terminal. Consequently, load on the network side can be reduced. However, there is the case where data is transmitted even when no target mobile terminal resides in the area. In such a case, OTASP is performed to rewrite software in mobile terminals based on data transmitted via radio from the server.

On the other hand, in OTASP using multicast, the network side has to confirm the presence of a target mobile terminal, and therefore, receive a response from the mobile terminal. Consequently, load on the network side increases. However, it is possible to avoid the transmission of data to the area where no target mobile terminal resides.

In the first several times, broadcast may be used because it is expected that there are a number of target mobile terminals. After several times of using broadcast, then, multicast may be used. Thereby, efficient OTASP can be achieved.

3GPP is currently reviewing MBMS (Multimedia Broadcast/Multicast Service). MBMS is aimed at efficiently utilizing radio resources with broadcast in which data is transmitted to all mobile terminals in the area and multicast in which data is transmitted to only a group of mobile terminals which wish to receive the data. This technique enables necessary data to be transmitted to only a group of specific mobile terminals.

In the current 3GPP specifications, each mobile terminal checks a bit of a page indication channel (PICH) in which the terminal has been registered. When the bit indicates "1", the mobile terminal reads information from a paging channel (PCH) to determine whether or not incoming data is addressed thereto. In accordance with the present invention, as with the 3GPP specifications, mobile terminals in idle mode intermittently receive the page indication channel according to an instruction from the network.

In order to update software in a specific mobile terminal, the network writes "1" to every bit of the page indication channel so that all mobile terminals can receive data. Besides, the network renders the paging channel to contain information on the type of the target mobile terminal (terminal category or classification) and the current version of the software of the mobile terminal which needs to be updated.

Each of all mobile terminals that have been instructed by the page indication channel to receive the paging channel compares its type (terminal category) and software version with those contained in the paging channel. As a result of the comparison, if they do not match, the mobile terminal returns to idle mode at the point. If they match, the mobile terminal receives necessary data by multicast or broadcast based on information from the paging channel. Whether multicast or broadcast is to be used is set on the network side so as to be recognized by the mobile terminal at the time of paging.

In the case of multicast, if there is even one response from a mobile terminal, data transmission is initiated, while there is no response, OTASP is terminated.

When having succeeded in updating the software version, a mobile terminal updates the version information of the software therein. On the other hand, when having failed to update the software version, a mobile terminal discards received data, and does not update the version information of the software therein. Thereby, a mobile terminal that has succeeded in updating the software version is not to receive the same data again, while a mobile terminal that has failed to update the software version can receive the same data again until it succeeds in the update of the software version.

EFFECT OF THE INVENTION

As set forth hereinabove, in accordance with the present invention, each mobile terminal does not waste its power, and software in a group of target terminals can be efficiently updated only when the software needs to be rewritten.

BEST MODE FOR CARRYING OUT THE INVENTION

Referring now to the drawings, a description of a preferred embodiment of the present invention will be given in detail. FIGS. 1 and 2 are diagrams showing examples of the operation of a mobile communication system according to an embodiment of the present invention. In the mobile communication system of this embodiment shown in FIG. 1, in mobile communication broadcasting or multicasting, a server (not shown) distributes data to a group of target mobile terminals 1-1 to 1-5 without a request therefrom, thereby updating software in the mobile terminals 1-1 to 1-5. In addition, software that has been once updated is not to be repeatedly updated.

In the case of ordinary broadcast, all the mobile terminals 1-1 to 1-5 can receive data. Meanwhile, in this embodiment, only the target mobile terminals 1-1 and 1-3 can receive data.

Besides, in the case of ordinary multicast, the users of the mobile terminals 1-1 to 1-5 joins the service of their own free will to receive data. Meanwhile, in this embodiment, the server pages, from the network side, the mobile terminals 1-1 to 1-5 using information that uniquely identifies them, such as IMEI-SV (the International Mobile station Equipment Identity and Software Version number). There is found a description of "IMEI-SV" in 3GPP TS23.003 V5.5.1 (2003-1), chapter 6.2.2.

The mobile terminals 1-1 to 1-5 have a function of checking the soundness of software so as not to receive the same data when succeeding in updating the software, and to receive the same data again when failing to update the software.

In FIG. 1, data (data on software in version "n" for type A terminals) is transmitted through a node B (base station) to the mobile terminals (UE: User Equipment) 1-1 to 1-5. The data are received by only the mobile terminals 1-1 and 1-3 of type A with software in version "n", and not received by the mobile terminal 1-4 of type B, the mobile terminal 1-2 of type A with software in version older than "n", and the mobile terminal 1-5 of type A with software in version later than "n"

In OTASP (Over The Air Service Provisioning) using broadcast, the network side is not required to confirm the presence of the target mobile terminals 1-1 and 1-3, and receive no response therefrom. Consequently, load on the network side can be reduced. However, there is the case where data is transmitted even when the target mobile terminals 1-1 and 1-3 do not reside in the area. In such a case, OTASP is performed to rewrite software in mobile terminals 1-1 to 1-5 based on data transmitted via radio from the server. There is found a description of "OTASP" in 3GPP TR23.846 6.1.0 (2002-12).

On the other hand, in OTASP using multicast, the network side has to confirm the presence of the target mobile terminals 1-1 and 1-3, and therefore, receive a response from each of them. Consequently, load on the network side increases. However, it is possible to avoid the transmission of data to the area where the target mobile terminals 1-1 and 1-3 do not reside.

Accordingly, in this embodiment, broadcast is used in the first several times because it is expected that there are a number of target mobile terminals. After several times of using broadcast, then, multicast is used. Thereby, efficient OTASP can be achieved.

FIG. 2 shows an example of the application of broadcast and multicast according to the embodiment. In the example of FIG. 2, software in mobile terminals UE#1 to UE#10 is rewritten, and the software version is updated from "3" to "4".

On the first day, the server broadcasts data on software in version "4". When paging the terminals, the server utilizes the current version "3". The terminals whose type and software version match those indicated by the server respond to the broadcast. In FIG. 2, the mobile terminals UE#1, UE#5, and UE#7 to UE#9 are on, and write the data on software in version "4" received from the server thereto. The other mobile terminals UE#2 to UE#4, UE#6, and UE#10 are off, and therefore, the data on software in version "4" from the server is not written to them.

Subsequently, on the second day, the server also broadcasts data on software in version "4". At this point, since the data has already been written to the mobile terminals UE#1, UE#5, and UE#7 to UE#9, their software version does not match that indicated by the server, and the terminals do not respond to the broadcast. Besides, the mobile terminals UE#2 to UE#4 are on, and write the data on software in version "4" received from the server thereto. The other mobile terminals UE#6 and UE#10 are still off, and therefore, the data on software in version "4" from the server is not written to them.

After using broadcast for preset N-1 days, on the Nth day, the server multicasts data on software in version "4" to the mobile terminals UE#6 and UE#10. At this point, since the data has already been written to the mobile terminals UE#1 to UE#5 and UE#7 to UE#9, the terminals do not respond to the multicast.

FIG. 3 is a block diagram showing the construction of a mobile communication system according to an embodiment of the present invention. Referring to FIG. 3, the mobile communication system of this embodiment comprises a mobile terminal (UE) 1, nodes B (base stations) 2-1 and 2-2, an RNC (Radio Network Controller) 3, an SGSN [Serving GPRS (General Packet Radio Service) Support Node] 4, a GGSN (Gateway GPRS Support Node) 5, server 6, and an IP (Internet Protocol) network 100.

In the following description, for simplicity, a page indication channel will be referred to as PICH, a paging channel will be referred to as PCH, and general terms in 3GPP (3rd Generation Partnership Project) will be utilized.

FIG. 4 is a block diagram showing the construction of the server 6 depicted in FIG. 3. Referring to FIG. 4, the server 6 comprises a data input/output section 61, a data storage 62, a data transmission controller (scheduler) 63, a multicast section 64, and a broadcast section 65.

The data input/output section 61 receives, from other equipment (e.g. equipment of program manufacturers providing programs such as a control program and application programs installed in the mobile terminal 1), data for updating the programs or the like, and stores the data in the data storage 62. Besides, the data input/output section 61 reads out data stored in the data storage 62 and sends it to the data transmission controller 63 to issue instructions for updating based on the data.

The data transmission controller 63 receives data from the data input/output section 61, and creates a schedule of data distribution by broadcast and multicast as previously described. According to the schedule, the data transmission controller 63 feeds the data to the multicast section 64 or the broadcast section 65.

The multicast section 64 sends the data to the GGSN 5 to multicast the data to the mobile terminal 1 according to the schedule created by the data transmission controller 63. The multicast section 64 is required to wait for a response from the GGSN 5. When having received no response, the multicast section 64 determines that there exists no target terminal belonging to the server, and is not to perform data transmission. The broadcast section 65 sends the data to the GGSN 5 to broadcast the data to the mobile terminal 1 according to the schedule created by the data transmission controller 63. Differently from the multicast section 64, the broadcast section 65 need not wait for a response from the GGSN 5. Each of the multicast section 64 and the broadcast section 65 initiates data transmission after a prescribed period of time during which each terminal may have been prepared for data reception.

FIG. 5 is a block diagram showing the construction of the mobile terminal (UE) 1 depicted in FIG. 3. Referring to FIG. 5, the mobile terminal 1 comprises an antenna 11, a radio communication section 12, a controller 13, a baseband section 18, a voice input/output section 19, a display 20, and a key operation section 21. The operation of each component is publicly known, and therefore, will not be described herein.

The controller 13 includes a CPU (Central Processing Unit) 14, a memory 15 for storing programs such as a control program and application programs executed by the CPU 14, a transfer method determination section 16, and a data transfer controller 17.

The transfer method determination section 16 determines whether data for version-up of software, etc. is to be broadcast or multicast from the server 6. The CPU 14 and the data transfer controller 17 operate according to the determination result.

When data for version-up of software, etc. is to be broadcast or multicast from the server 6, the CPU 14 and the data transfer controller 17 compare the software version of the terminal with a version indicated by data from the server 6. If the versions do not match, the CPU 14 and the data transfer controller 17 terminates the operation. If the versions match, the CPU 14 and the data transfer controller 17 transmit a response to the network side when multicast is to be used, while they transmit nothing to the network side when broadcast is to be used and prepare for data reception.

On this occasion, the mobile terminal 1 is required only to monitor a paging channel as well as to perform the aforementioned comparison, and supply power to the sections necessary for receiving the data. Differently form conventional broadcast data reception, the mobile terminal 1 need not supply power to all the sections.

FIG. 6 is a diagram showing the construction of a PICH, and the relation between a PICH and a PCH according to the present invention. In FIG. 6, the mobile terminal 1 that cannot individually communicate with the RNC 3 {idle, Cell/URA [UTRAN (UMTS Terrestrial Radio Access Network) Registration Area]_PCH} intermittently receive a PICH in the timing indicated by the RNC 3. This operation is necessary for the mobile terminal 1 to receive data.

The timing in which the mobile terminal 1 receives the PICH is calculated from the value of the identifier [IMSI (International Mobile Subscriber Identity)] thereof, etc. One frame of the PICH consists of 300 bits, of which the last 12 bits are reserved.

In addition, a bit of the PICH which the mobile terminal 1 monitors is also calculated from the value of the identifier (IMSI) thereof, etc. When the bit of the PICH which the mobile terminal 1 monitors indicates "1", the mobile terminal 1 receives a PCH corresponding to the PICH.

In the current 3GPP specifications, each mobile terminal checks a bit of a page indication channel (PICH) in which the terminal has been registered. When the bit indicates "1", the mobile terminal reads information from a paging channel (PCH) to determine whether or not incoming data is directed thereto. In this embodiment, as with the 3GPP specifications, mobile terminals in idle mode intermittently receive the page indication channel according to an instruction from the network (see FIGS. 6 and 7).

FIGS. 7 to 9 are diagrams showing images of a change in a UE identifier in a PCH. In FIGS. 7 to 9, since a PICH is limited in the number of frame numbers (0 to 4095) and the number of bits (288), each bit of the PICH is not always assigned to one UE.

For example, if a bit of the PICH is assigned to three UEs, by setting the bit to "1", the three UEs receive a PCH. However, the three UEs rarely ever receive incoming data at the same time, and it is necessary to indicate to which of them the bit "1" is applied. Such an indication is provided by UE Identity contained in the PCH. Having received the PCH, each UE necessarily check the UE Identity to determine whether or not incoming data is addressed thereto.

It is assumed herein that one data is transmitted and a plurality of UEs receive the data simultaneously. That is, a plurality of UEs (UEs of a specific type with software in a specific version) where data is to be transmitted need to receive the data simultaneously. Each UE is provided with a different identifier, and therefore, every bit of the PICH is set to "1" so that all UEs can receive data. However, in the case of UE Identity in the current PCH, UE identity is set for individual UEs, which is not suitable for the case where a plurality of UEs receive the data simultaneously.

Accordingly, IMEI-SV is added to UE identity, and the type and software version of UEs where data is to be transmitted are used as a UE identifier. Thereby, target UEs can be grouped. Although IMEI-SV contains a serial number that identifies each UE, serial number information is not used herein because the intention is that a group of specific UEs receive data simultaneously.

In addition, if every bit of the PICH is set to "1" as described above, target UEs respond to a paging message or request all together, which may put pressure on the up-link radio capacity and also increase processing load on the network side. As such, it may not be the best way to set every bit of the PICH to "1". For example, bits of the PICH to be set to "1" may be shifted by 10 bits every few minutes during which the download of software is likely to have been completed.

Further, by setting a parameter other than IMEI-SV as UE identity, the aforementioned technique can be applied to, for example, the update of middleware or applications.

In this embodiment, as is previously mentioned, to update software in specific mobile terminals, the network writes "1" to every bit of the page indication channel so that all mobile terminals can receive data. Besides, the network renders the paging channel to contain information on the type of the target mobile terminals and the current version of the software of the mobile terminals which needs to be updated (see FIGS. 7 to 9).

FIG. 10 is a flowchart showing the operation of the server 6 depicted in FIG. 3. Referring to FIGS. 1 to 10, a description will be given of the operation of the server 6 according to an embodiment of the present invention. When software has to be changed for the version-up or the like (FIG. 10, step S1), the server 6 broadcasts, at the time (e.g. at midnight when the mobile terminal 1 is less used) preset as broadcast distribution time (FIG. 10, step S2), the contents of the change in software through the broadcast section 65 (FIG. 10, step S3).

Until the broadcast distribution is performed a preset number of times (=L), the server 6 repeats the above process (FIG. 10, step S4). Besides, during days (=M) preset as broadcast distribution period (e.g. a week, a month, etc.), the server 6 performs the above process at the broadcast distribution time every day (FIG. 10, step S5).

After the days (=M) as the broadcast distribution period has passed (FIG. 10, step S5), the server 6 multicasts, at the time preset as multicast distribution time (FIG. 10, step S6), an OTASP request (FIG. 10, step S7).

If even only one terminal responds to the request (FIG. 10, step S8), the server 6 multicasts the contents of the change in software through the multicast section 64 (FIG. 10, step S9). During days (=K) preset as multicast distribution period (e.g. a week, a month, etc.), the server 6 performs the above process at the multicast distribution time every day (FIG. 10, step S10).

On completion of the multicast distribution of software, it is possible to prompt each terminal to update the software version with information such as location registration information.

FIG. 11 is a flowchart showing the operation of the mobile terminal 1 depicted in FIG. 3. Referring to FIGS. 1 to 9 and 11, a description will be given of the operation of the mobile terminal 1 according to an embodiment of the present invention.

The mobile terminal 1 receives a PCH in the same manner as previously described (FIG. 11, steps S21 to S23). The mobile terminal 1 analyzes the received PCH to recognize if conventional data reception, conventional MBMS (Multimedia Broadcast/Multicast Service), broadcast OTASP or multicast OTASP is to be performed (FIG. 11, steps S24 and S25). Here, the specifications of MBMS have not been determined, and a CH other than the PCH may be used. There is found a description of "MBMS" in 3GPP TS23.246 V0.32.01 (2002-06).

In the case of broadcast OTASP (FIG. 11, steps S24), since the network side is not required to confirm the presence of a mobile terminal subjected to OTASP, the mobile terminal 1 transmits no response to a signal therefrom, and prepares for receiving OTASP data (FIG. 11, steps S30). The PCH contains information for receiving the data.

On the other hand, in the case of multicast OTASP (FIG. 11, steps S25), since the network side has to confirm the presence of a mobile terminal subjected to OTASP, the mobile terminal 1 transmits an RRC (Radio Resource Control) connection request as a response to a paging message or request (FIG. 11, steps S27). Thereafter, the mobile terminal 1 prepares for receiving OTASP data (FIG. 11, steps S28).

Incidentally, in the case of broadcast OTASP or multicast OTASP, the mobile terminal 1 compares its type (terminal category) and software version with those contained in the PCH (FIG. 11, steps S26 and S29).

As a result of the comparison, if they do not match, the mobile terminal 1 returns to idle mode at the point. If they match, the mobile terminal receives necessary data by multicast or broadcast based on information from the PCH (FIG. 11, steps S28 and S30). Whether multicast or broadcast is to be used is set on the network side so as to be recognized by the mobile terminal 1 at the time of paging.

FIG. 12 is a sequence chart showing the data transmission process (the process when OTASP is performed by multicast) according to an embodiment of the present invention. Referring to FIGS. 3 and 12, a description will be given of the process when OTASP is performed by multicast.

When there is a mobile terminal (UE#1, UE#2) that needs the update of the software version, the server 6 transmit an OTASP request to the GGSN 5 (FIG. 12, a1). The message contains terminal type and software version information, and also the identifier of the server 6 so that a response from the mobile terminal (UE#1, UE#2) can be forwarded to the server 6. In this case, data transfer mode is designated, and the operation of the RNC 3 varies according to the transfer mode. Here, for example, multicast is set as the transfer mode.

Having received the OTASP request from the server 6, the GGSN 5 forwards the request to the SGSN 4 using a GTP (GPRS Tunneling Protocol)-C message (FIG. 12, a2).

Having received the OTASP request from the GGSN 5, the SGSN 4 forwards the request to the RNC 3 using a RANAP (Radio Access Network Application Part) paging message (FIG. 12, a3).

Multicast is used when the RNC 3 recognizes the target mobile terminal (UE#1, UE#2). Therefore, the RNC 3 transmits an RRC paging message to the mobile terminal (UE#1, UE#2) (FIG. 12, a4), and waits for a response therefrom. This paging is performed in the manner described previously in connection with FIGS. 6 to 9.

In the case of multicast, the mobile terminal (UE#1, UE#2) transmits an RRC connection request to the RNC 3. In this embodiment, the mobile terminal (UE#1, UE#2) compares its type and software version with those contained in the paging channel, and if they match (FIG. 12, a5), transmits the RRC connection request to the RNC 3.

After that, the mobile terminal (UE# 1, UE#2) configures a default tunnel (FIG. 12, a7) to join the server 6, and thereby joins the server 6 to indicate an intention to receive OTASP data (FIG. 12, a8). This process is performed based on the 3GPP MBMS standard.

When having received a join response even from only one mobile terminal (UE#1, UE#2), the server 6 initiates the transmission of OTASP data (FIG. 12, a9). Each equipment item on the network transmits data based on MBMS.

On completion of the transmission of the OTASP data, the server 6 informs the GGSN 5 of the completion of the data transmission using an OTASP complete message (FIG. 12, a10). The OTASP complete message contains the terminal type and software version information contained in the OTASP request.

Having received the OTASP complete message from the server 6, the GGSN 5 forwards the message to the SGSN 4 using a GTP-C message (FIG. 12, a11). Having received the OTASP complete message from the GGSN 5, the SGSN 4 forwards the message to the RNC 3 using a RANAP message (FIG. 12, a12).

Having received the OTASP complete message from the SGSN 4, the RNC 3 transmits the OTASP complete message to the target mobile terminal (UE#1, UE#2) using an RRC message to inform the terminal of the completion of the data transmission (FIG. 12, a13). The method described previously in connection with FIGS. 6 to 9. is also applied to this message.

When having received the OTASP data properly and completed the update of the software, the mobile terminal (UE#1, UE#2) updates the version information of the software therein (FIG. 12, a14).

FIG. 13 is a sequence chart showing the data transmission process (the process when OTASP is performed by broadcast) according to an embodiment of the present invention. Referring to FIGS. 3 and 13, a description will be given of the process when OTASP is performed by broadcast.

When there is a mobile terminal (UE#1, UE#2) that needs the update of the software version, the server 6 transmit an OTASP request to the GGSN 5 (FIG. 13, a21). The message contains terminal type and software version information. Besides, data transfer mode is designated, and the operation of the RNC 3 varies according to the transfer mode. In this case, the server 6 need not receive a signal from the mobile terminal (UE#1, UE#2), and therefore, the message does not contain information used for forwarding a signal to the server 6.

Having received the OTASP request from the server 6, the GGSN 5 forwards the request to the SGSN 4 using a GTP-C message (FIG. 13, a22). Having received the OTASP request from the GGSN 5, the SGSN 4 forwards the request to the RNC 3 using a RANAP paging message (FIG. 13, a23)

Broadcast is used when it is not necessary to recognize the target mobile terminal (UE#1, UE#2). Therefore, the RNC 3 transmits a broadcast paging message instead of a normal paging message containing an indication to wait for a response from the target mobile terminal (UE#1, UE#2) (FIG. 13, a24). The method described previously in connection with FIGS. 6 to 9 is also applied to this message. In addition, this process is performed based on the 3GPP MBMS standard.

As is described above, the mobile terminal (UE#1, UE#2) compares its type and software version with those contained in the paging channel, and if they match (FIG. 13, a25), prepares for receiving OTASP data (FIG. 13, a26). This process is performed based on the 3GPP MBMS standard.

After that, the server 6 initiates the transmission of OTASP data (FIG. 13, a27). Each equipment item on the network transmits data based on the 3GPP MBMS standard.

On completion of the transmission of the OTASP data, the server 6 informs the GGSN 5 of the completion of the data transmission using an OTASP complete message (FIG. 13, a28). The OTASP complete message contains the terminal type and software version information contained in the OTASP request.

Having received the OTASP complete message from the server 6, the GGSN 5 forwards the message to the SGSN 4 using a GTP-C message (FIG. 13, a29). Having received the OTASP complete message from the GGSN 5, the SGSN 4 forwards the message to the RNC 3 using a RANAP message (FIG. 13, a30).

Having received the OTASP complete message from the SGSN 4, the RNC 3 transmits the OTASP complete message to the target mobile terminal (UE#1, UE#2) using an RRC message to inform the terminal of the completion of the data transmission (FIG. 13, a31). The method described previously in connection with FIGS. 6 to 9 is also applied to this message.

When having received the OTASP data properly and completed the update of the software, the mobile terminal (UE#1, UE#2) updates the version information of the software therein (FIG. 13, a32).

FIG. 14 is a flowchart showing operation (operation when OTASP is performed by multicast) on the side of the server 6 depicted in FIG. 3. Referring to FIGS. 3 and 14, a description will be given of operation on the server 6 side when OTASP is performed by multicast.

In the case of multicast, when there is no target mobile terminal 1, data is not transmitted. Accordingly, the server 6 activates a timer (not shown) to wait for a response from the mobile terminal 1 concurrently with the transmission of an OTASP request (FIG. 14, step S41).

If having received no response from the mobile terminal 1 before the timer expires (FIG. 14, steps S42 and S43), the server 6 terminates OTASP (FIG. 14, step S45). The timer is used for the purposes of checking the presence of the target mobile terminal 1 as well as collecting responses from a group of target mobile terminals.

If having received a response from the mobile terminal 1 before the timer expires (FIG. 14, steps S42 and S43), the server 6 initiates the transmission of OTASP data (FIG. 14, step S44).

When performing multicast, as is described above, the server 6 initiates the transmission of OTASP data if there is even only one response received from a mobile terminal, while it does not transmit data and terminates OTASP if there is no response.

In the above description, multicast paging is used to update the software version of terminals. However, multicast paging may also be used to obtain statistics of the number of terminals that use software in a specific version, or to provide specific software to the terminals. The above application of multicast paging is cited merely by way of example and without limitation.

FIG. 15 is a flowchart showing the data processing operation of the mobile terminal 1 depicted in FIG. 3. Referring to FIGS. 3 and 15, a description will be given of the data processing operation of the mobile terminal 1.

Upon initiation of OTASP data reception, the mobile terminal 1 activates a timer to wait for an OTASP complete message considering the case where the message does not arrive (FIG. 15, steps S51 and 52).

Having been informed of the completion of OTASP by an RRC message (FIG. 15, step S53), and succeeded in updating the software (FIG. 15, step S54), the mobile terminal 1 updates the version information of the software therein (FIG. 15, step S55).

The OTASP complete message contains the terminal type and software version information contained in an OTASP request. Therefore, if rewriting the software version information before receiving the OTASP complete message, the mobile terminal 1 cannot receive the message.

If the OTASP complete timer expires (FIG. 15, step S52) or the completion of OTASP is reported before succeeding in updating the software (FIG. 15, steps S53 and S54), the mobile terminal 1 discards OTASP data which have been received until that time (FIG. 15, step S56). Then, the mobile terminal 1 terminates the operation, and utilizes previous terminal type and software version information. As an example of the case where the update of software fails may be cited that the mobile terminal 1 is informed of the completion of OTASP before completing the data reception.

As is described above, when having succeeded in updating the software, the mobile terminal 1 updates the version information of the software therein. On the other hand, when having failed to update the software, the mobile terminal 1 discards received data, and does not update the version information of the software therein.

Thereby, the mobile terminal 1 is not to receive the same data again if having succeeded in updating the software, while the mobile terminal 1 can receive the same data again if having failed to update the software version since it does not update software version information until succeeding in the update of the software.

As set forth hereinabove, according to this embodiment, MBMS is applied to OTASP for rewriting a program to update the version of software or the like. Therefore, each mobile terminal does not waste its power, and software in a group of target terminals can be efficiently updated only when the software needs to be rewritten.

Further, information that uniquely identifies a mobile terminal (e.g. information on terminal type and software version contained in IMEI-SV) is utilized. Thereby, mobile terminals can be efficiently grouped.

Furthermore, a mobile terminal that has completed the update of the software updates the version information of the software therein. Thus, the mobile terminal can avoid the repeated reception of the same data.

BRIEF DESCRIPTION OF THE DRAWINGS

FIGS. 2(*a*) to 2(*c*) are diagrams showing an example of the operation of a mobile communication system according to an embodiment of the present invention.

FIG. 7 is a diagram showing an image of a change in a UE identifier in a PCH.

FIG. 8 is a diagram showing an image of a change in a UE identifier in a PCH.

FIG. 14 is a flowchart showing operation on the side of the server depicted in FIG. 3.

FIG. 15 is a flowchart showing the data processing operation of the mobile terminal depicted in FIG. 3.

Figure 1:
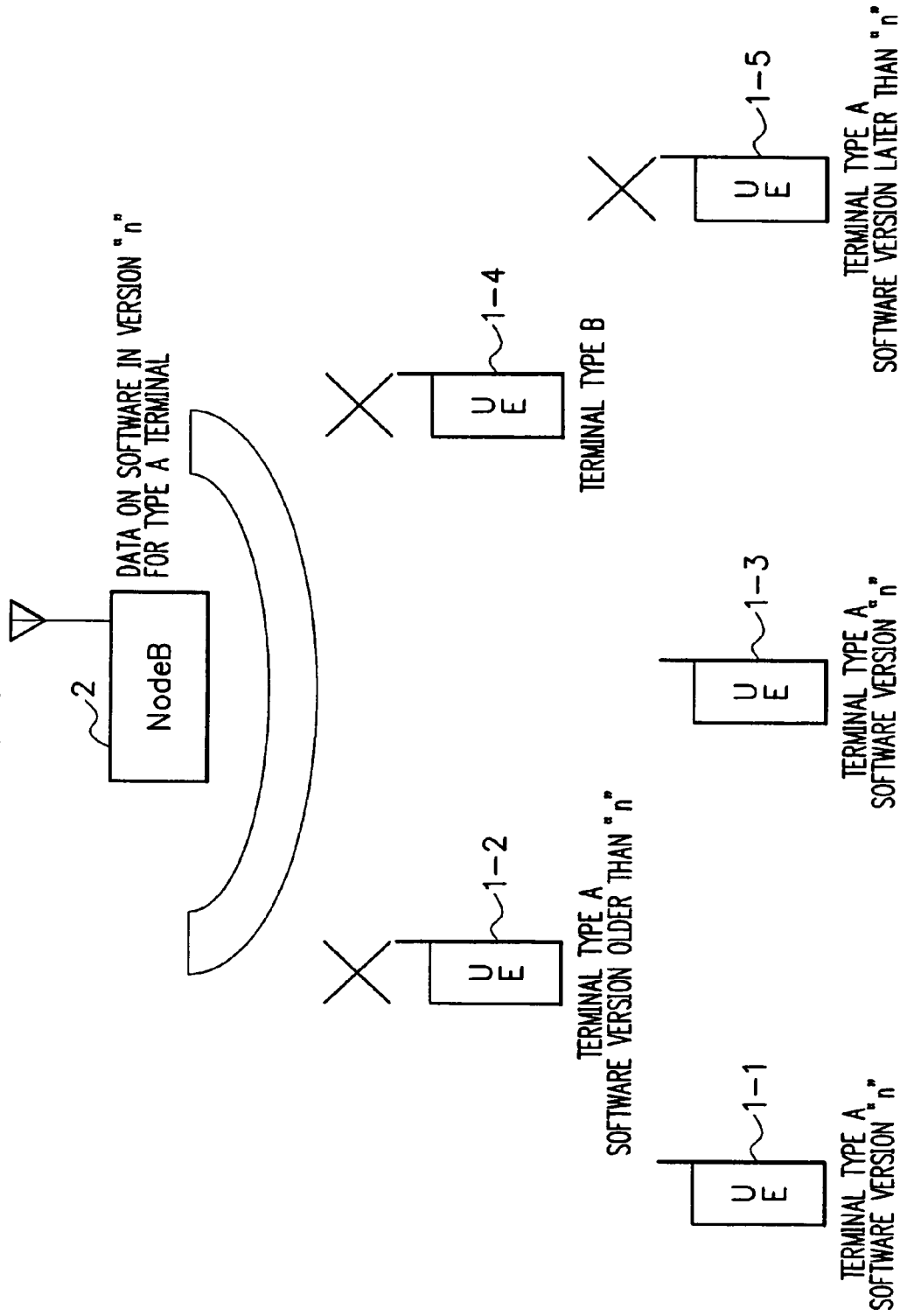
FIG. 1 is a diagram showing an example of the operation of a mobile communication system according to an embodiment of the present invention.
Figure 3:
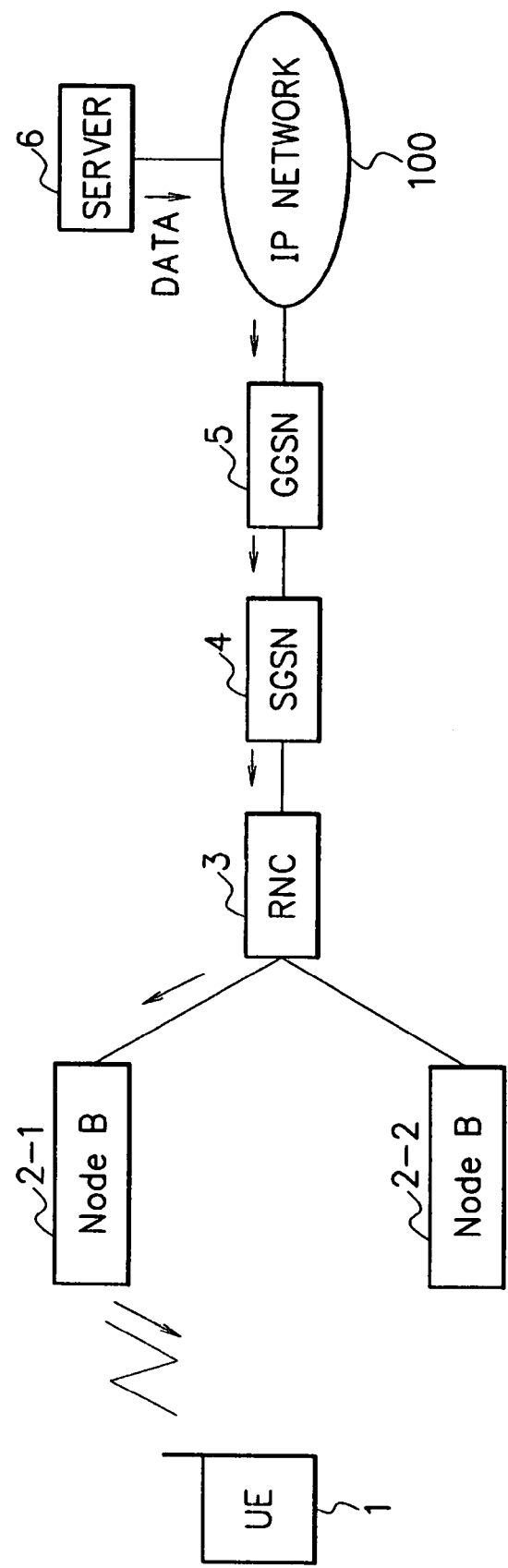
FIG. 3 is a block diagram showing the construction of a mobile communication system according to an embodiment of the present invention.
Figure 4:
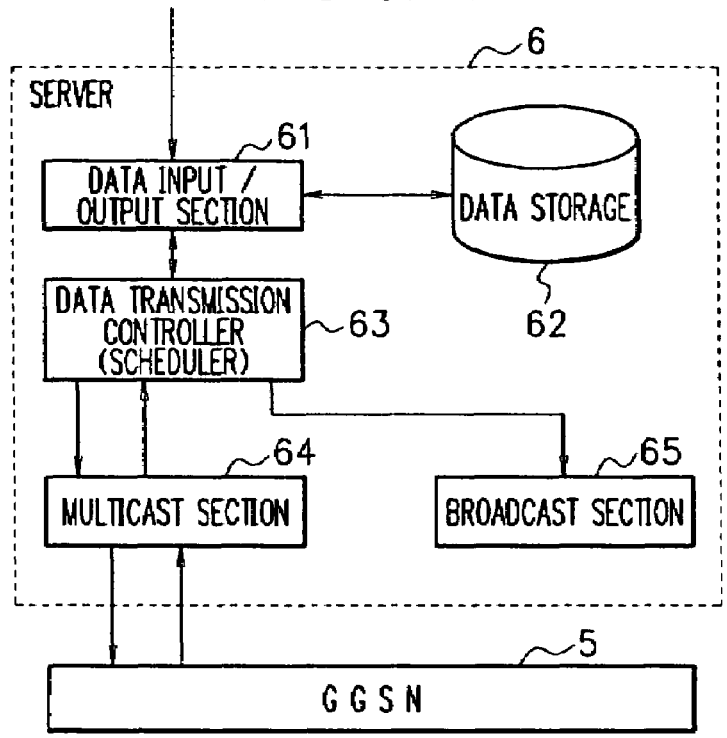
FIG. 4 is a block diagram showing the construction of a server depicted in FIG. 3.
Figure 5:
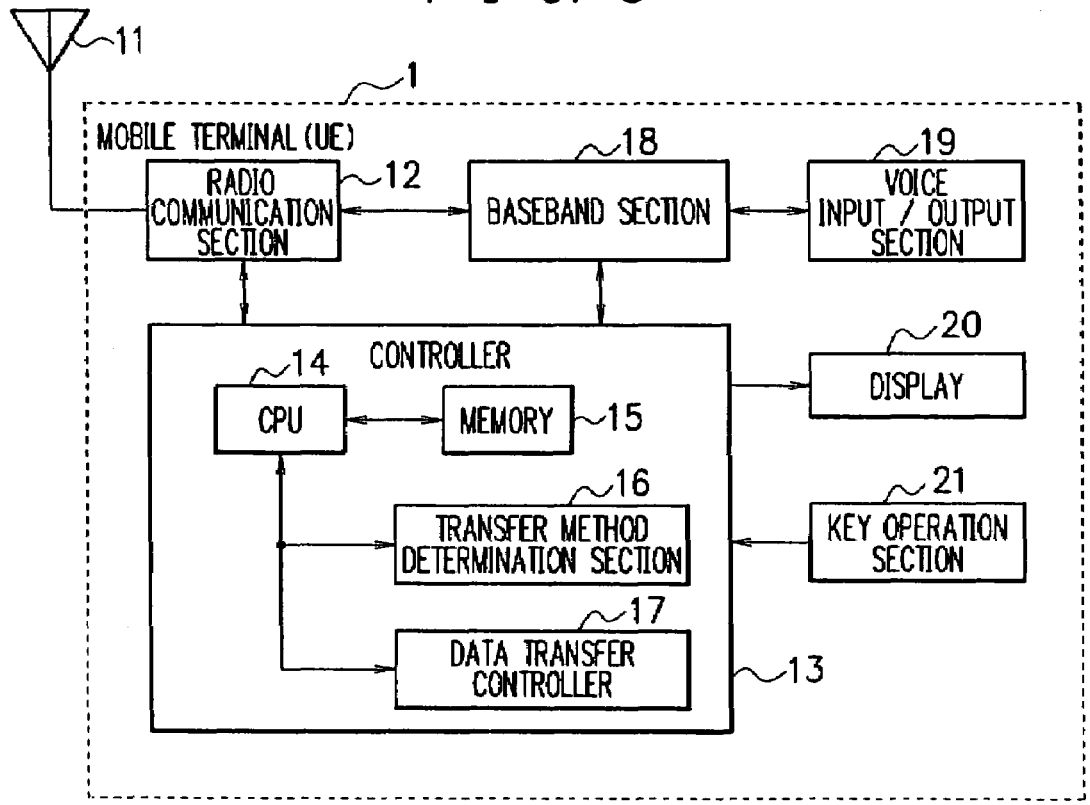
FIG. 5 is a block diagram showing the construction of a mobile terminal depicted in FIG. 3.
Figure 6:
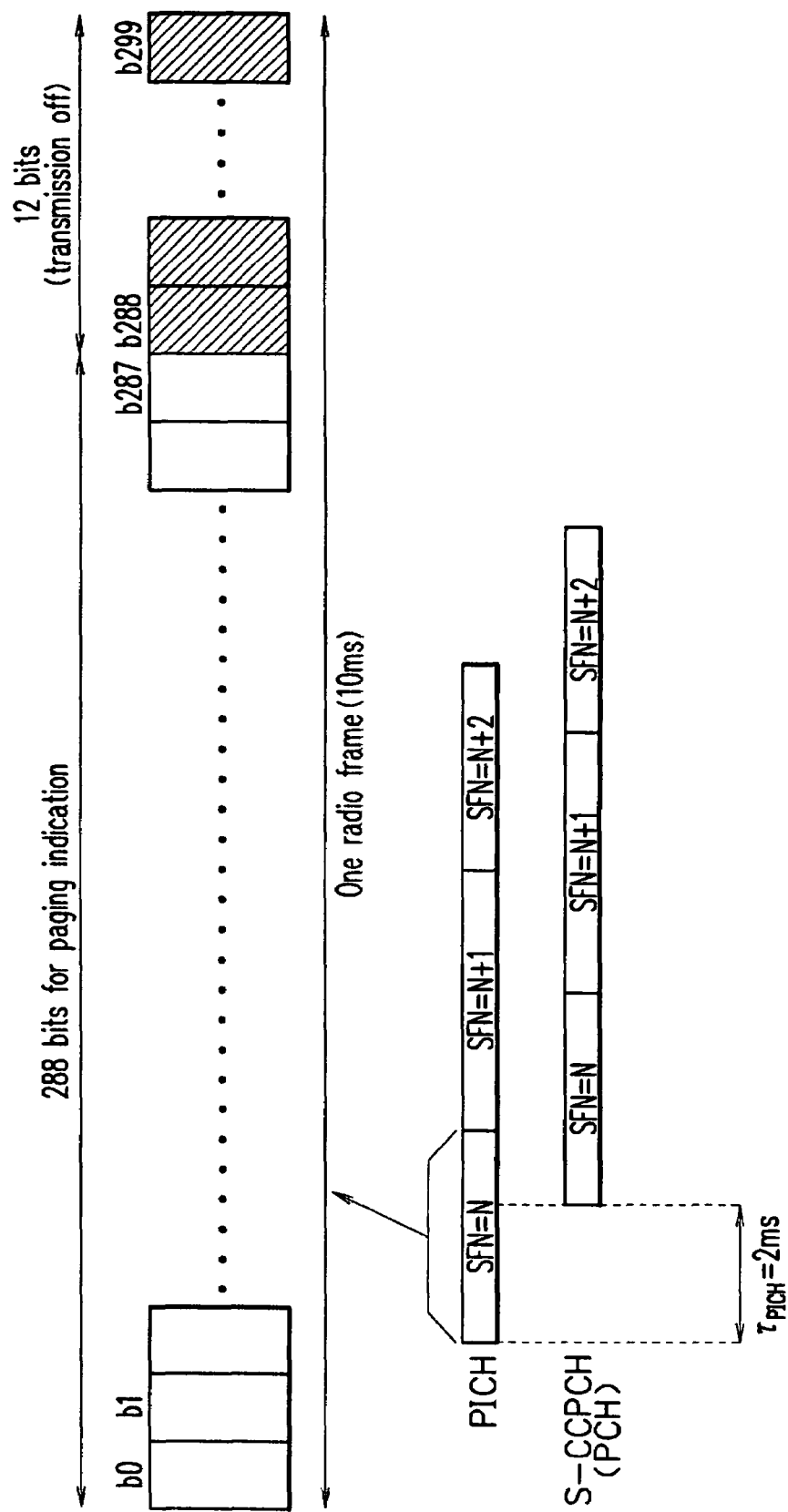
FIG. 6 is a diagram showing the construction of a PICH, and the relation between a PICH and a PCH according to the present invention.
Figure 9:
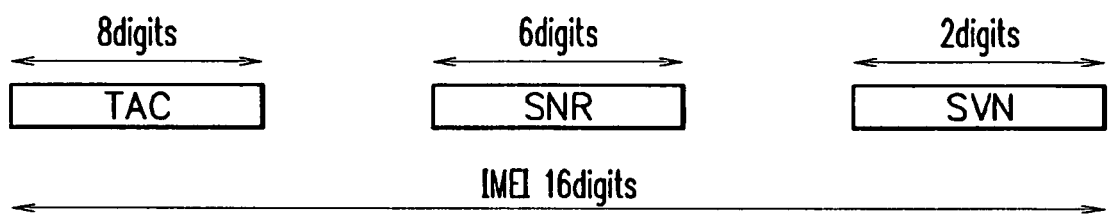
FIG. 9 is a diagram showing an image of a change in a UE identifier in a PCH.
Figure 10:
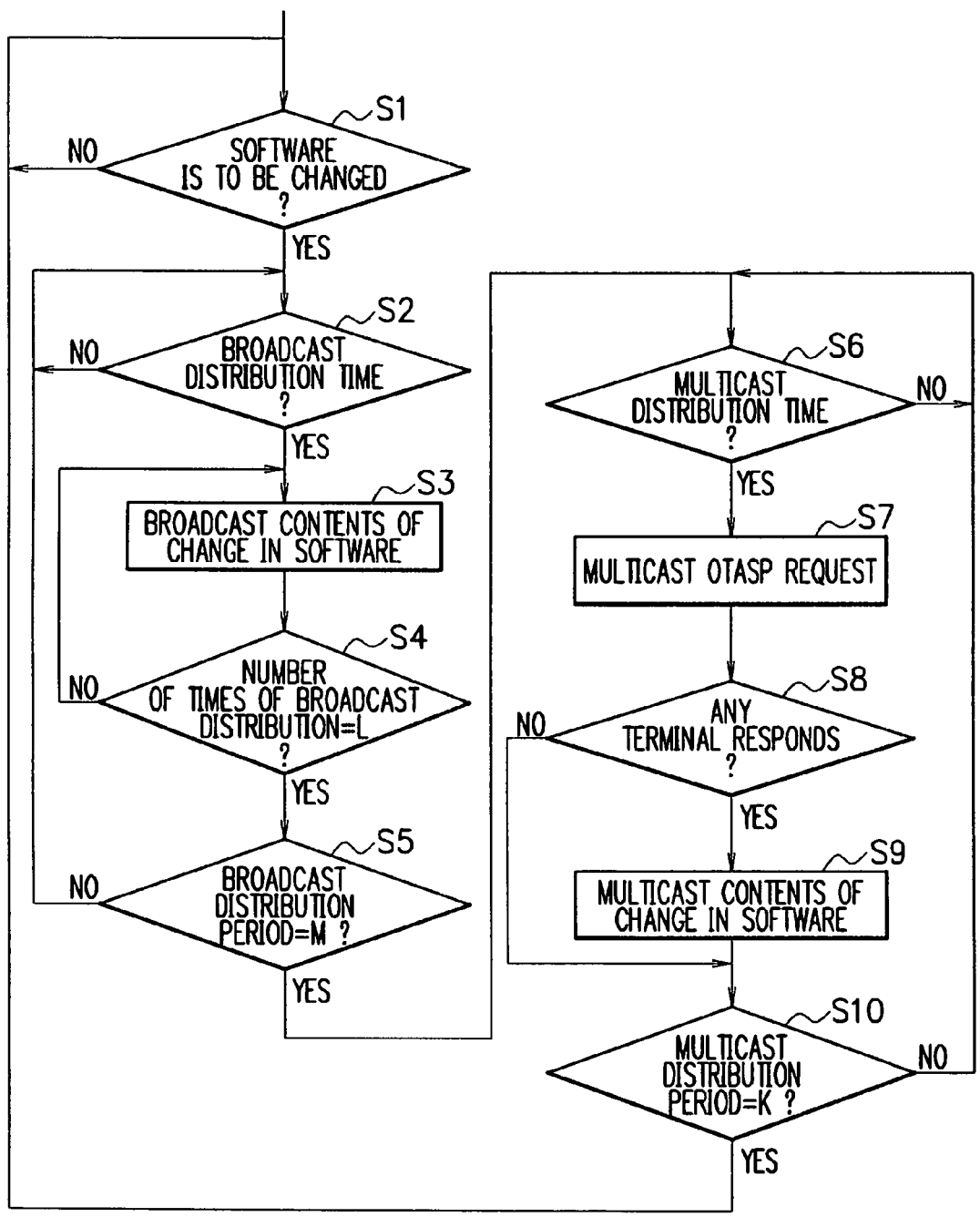
FIG. 10 is a flowchart showing the operation of the server depicted in FIG. 3.
Figure 11:
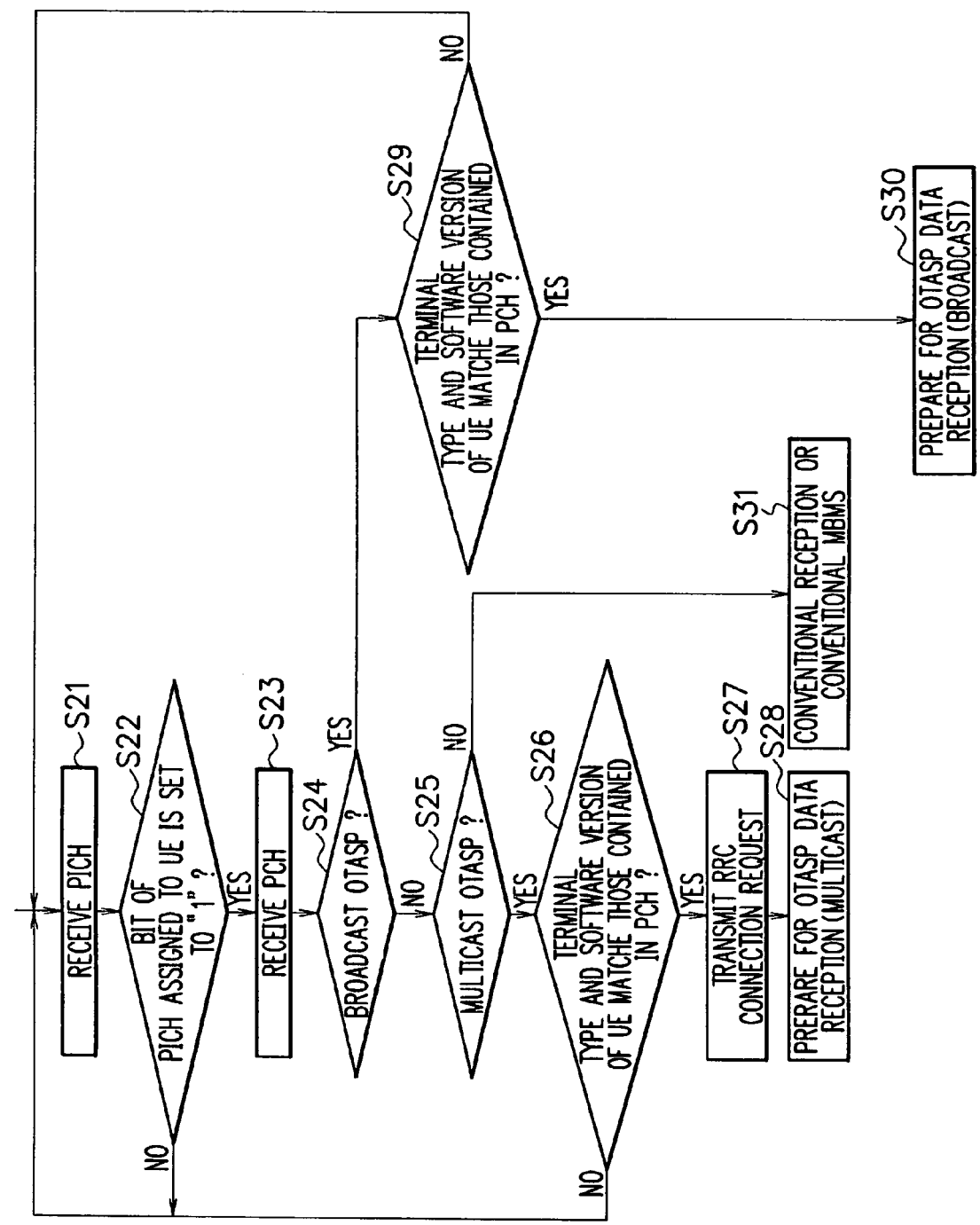
FIG. 11 is a flowchart showing the operation of the mobile terminal depicted in FIG. 3.
Figure 12:
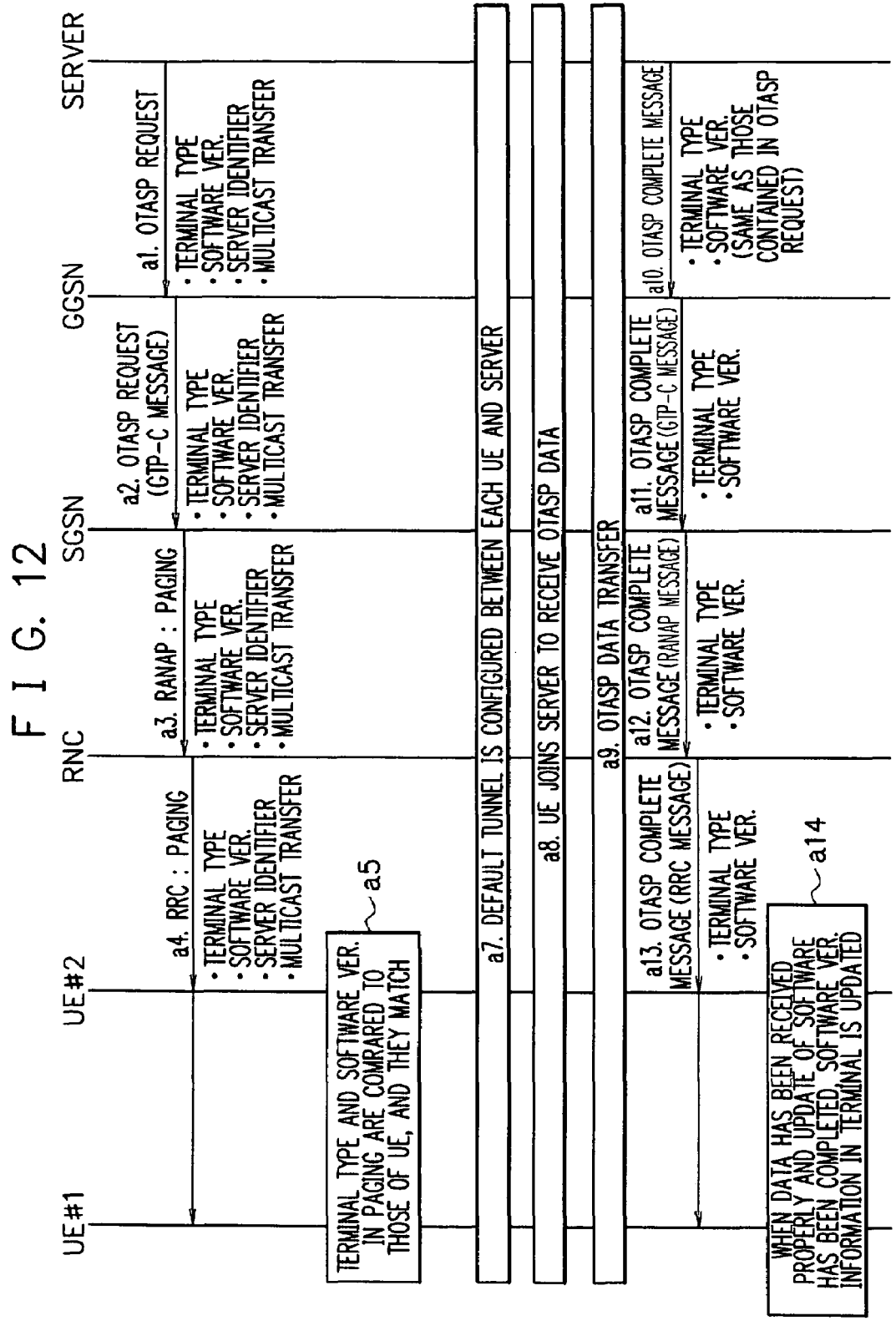
FIG. 12 is a sequence chart showing the data transmission process by OTASP according to an embodiment of the present invention.
Figure 13:
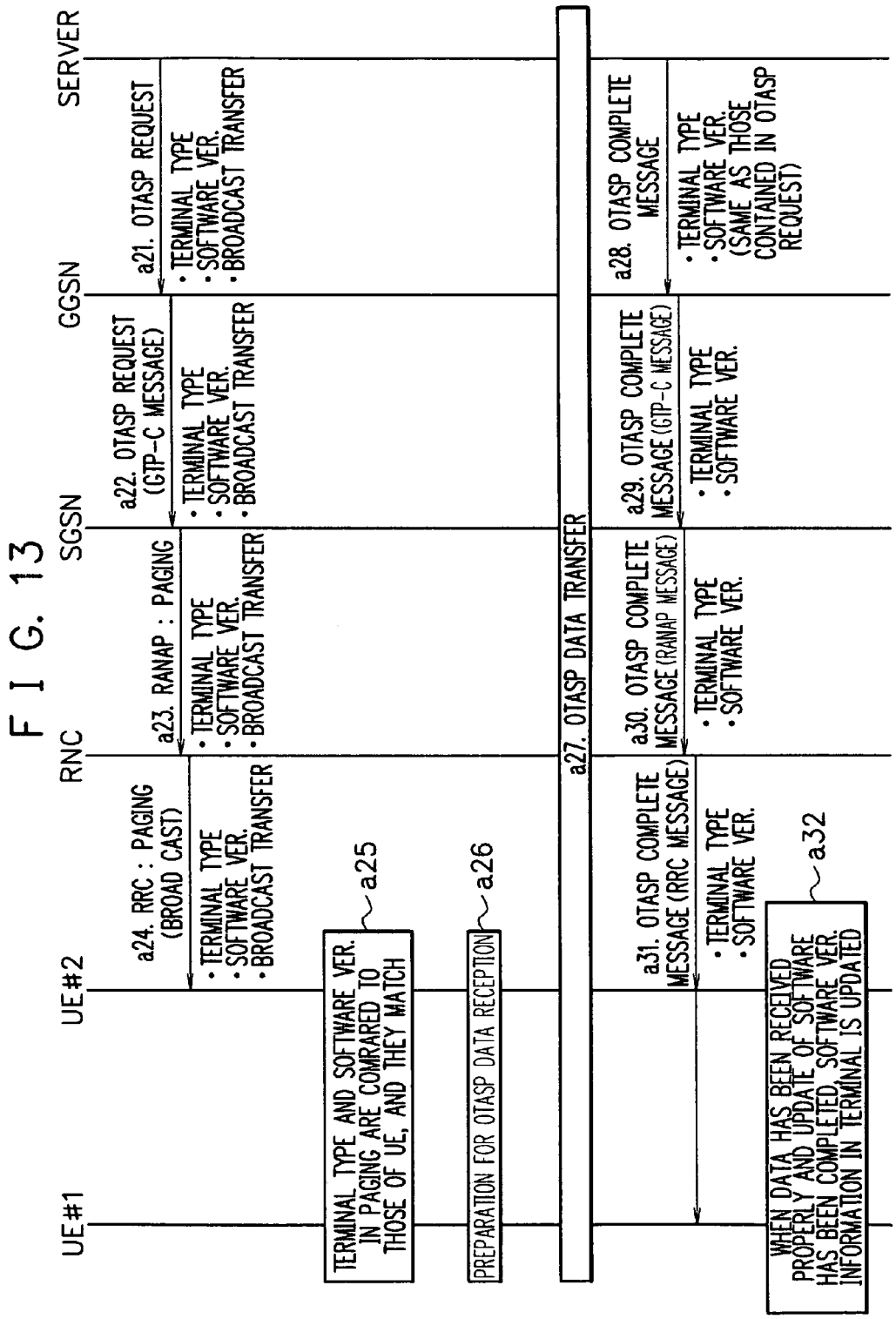
FIG. 13 is a sequence chart showing the data transmission process by OTASP according to an embodiment of the present invention.

DESCRIPTION OF CODES 1, 1-1 to 1-5 Mobile terminal
2, 2-1, 2-2 Node B
3 RNC
4 SGSN
5 GGSN
6 Server
11 Antenna
12 Radio communication section
13 Controller
14 CPU
15 Memory
16 Transfer method determination section
17 Data transfer controller
18 Baseband section
19 Voice input/output section
20 Display
21 Key operation section
61 Data input/output section
62 Data storage
63 Data transmission controller
64 Multicast section
65 Broadcast section
100 IP network

The invention claimed is:

1. A mobile communication system in which OTASP (Over The Air Service Provisioning) is performed to rewrite software in mobile terminals based on data transmitted via radio from a server, wherein:

the server includes a means for paging a target mobile terminal by transmitting thereto, when OTASP is to be performed, a request attached with information on the type of the mobile terminal and the version of the software; and the mobile terminal comprises: a means for determining, based on the information attached to the request, whether or not the data is to be multicast or broadcast to the terminal; a means for, when having determined that the data is to be multicast, transmitting a response to the request before receiving the data; and a means for, when having determined that the data is to be broadcast, receiving the data without transmitting a response to the request, wherein the server broadcasts the data repeatedly until a predetermined period of time has expired, and then immediately multicasts the data, and wherein the mobile terminal activates a timer upon initiation of OTASP data reception and if the OTASP data reception is complete before the timer expires, the mobile terminal updates version information of the software on the mobile terminal and if the timer expires before the OTASP data reception is complete, the mobile terminal discards OTASP data that has been received, terminates the OTASP data reception and sets version information of the software on the mobile terminal to a previous version.

2. The mobile communication system claimed in claim 1, wherein the mobile terminal comprises: a means for determining, based on the terminal type and software version information, whether or not the request is directed to the terminal: and a means for, when having determined that the request is directed to the terminal, updating the software based on the data transmitted from the server.

3. The mobile communication system claimed in claim 1 or 2, wherein the server multicasts the data using a known ID used to perform mutual authentication with the mobile terminal.

4. The mobile communication system claimed in claim 1 or 2, wherein the mobile terminal includes a means for preventing the version information of the software from being updated until the software has been updated based on the data.

5. The mobile communication system claimed in claim 1, wherein the server broadcasts the data using a known ID used to perform mutual authentication with the mobile terminal.

6. A mobile terminal in a mobile communication system in which OTASP (Over The Air Service Provisioning) is performed to rewrite software in the mobile terminal based on data transmitted via radio from a server, comprising: a means for determining, based on terminal type and software version information attached to a request received when OTASP is to be performed, whether or not the request is directed to the terminal; and a means for, when having determined that the request is directed to the terminal, updating the software based on the data transmitted from the server; a means for determining, based on the information attached to the request, whether or not the data is to be multicast or broadcast to the terminal; a means for, when having determined that the data is to be multicast, transmitting a response to the request before receiving the data; and a means for, when having determined that the data is to be broadcast, receiving the data without transmitting a response to the request, wherein the server broadcasts the data repeatedly until a predetermined period of time has expired, and then immediately multicasts the data, and wherein the mobile terminal activates a timer upon initiation of OTASP data reception and if the OTASP data reception is complete before the timer expires, the mobile terminal updates version information of the software on the mobile terminal and if the timer expires before the OTASP data reception is complete, the mobile terminal discards OTASP data that has been received, terminates the OTASP data reception and sets version information of the software on the mobile terminal to a previous version.

7. The mobile terminal claimed in claim 6, further comprising a means for preventing the version information of the software from being updated until the software has been updated based on the data.

8. A data transmission method applied to a mobile communication system in which OTASP (Over The Air Service Provisioning) is performed to rewrite software in mobile terminals based on data transmitted via radio from a server, the method comprising the steps of: on the server side, paging a target mobile terminal by transmitting thereto, when OTASP is to be performed, a request attached with information on the type of the mobile terminal and the version of the software; and on the mobile terminal side, determining, based on the information attached to the request, whether or not the data is to be multicast or broadcast to the terminal; when having determined that the data is to be multicast, transmitting a response to the request before receiving the data; and, when having determined that the data is to be broadcast, receiving the data without transmitting a response to the request, wherein the server broadcasts the data repeatedly until a predetermined period of time has expired, and then immediately multicasts the data, and wherein the mobile terminal activates a timer upon initiation of OTASP data reception and if the OTASP data reception is complete before the timer expires, the mobile terminal updates version information of the software on the mobile terminal and if the timer expires before the OTASP data reception is complete, the mobile terminal discards OTASP data that has been received, terminates the OTASP data reception and sets version information of the software on the mobile terminal to a previous version.

9. The data transmission method claimed in claim 8, comprising, on the mobile terminal side, the steps of: determining, based on the terminal type and software version information, whether or not the request is directed to the terminal; and, when having determined that the request is directed to the terminal, updating the software based on the data transmitted from the server.

10. The data transmission method claimed in claim 8 or 9, wherein the server multicasts the data using a known ID used to perform mutual authentication with the mobile terminal.

11. The data transmission method claimed in claim 8 or 9, including, on the mobile terminal side, the step of preventing the version information of the software from being updated until the software has been updated based on the data.

* * * * *